United States Patent
Morise

(10) Patent No.: US 6,712,301 B2
(45) Date of Patent: Mar. 30, 2004

(54) SEALING STRUCTURE FOR FISHING REEL

(75) Inventor: Taisei Morise, Sakai (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 10/042,183

(22) Filed: Jan. 11, 2002

(65) Prior Publication Data

US 2002/0096587 A1 Jul. 25, 2002

(30) Foreign Application Priority Data

Jan. 24, 2001 (JP) .......................................... 2001-015596

(51) Int. Cl.⁷ .................... A01K 89/00; A01K 89/01; A01K 89/015
(52) U.S. Cl. ........................ 242/319; 242/282
(58) Field of Search ................. 242/319, 321, 242/282, 283

(56) References Cited

U.S. PATENT DOCUMENTS 5,415,359 A   5/1995   Ikuta

2002/0023980 A1   2/2002   Matsuda et al.

FOREIGN PATENT DOCUMENTS

JP   57-201173   6/1981

Primary Examiner—Emmanuel M. Marcelo
(74) Attorney, Agent, or Firm—Shinjyu Global IP Counselors, LLP

(57) ABSTRACT

Sealing structure has a friction disk having a spindle-form boss portion, a cover member, and a seal member, in a lever-drag type dual-bearing reel. Cover member has a through-hole situated encompassing the boss portion, and is a component that is rotatable relative to friction disk. The seal member, which is a component made of an elastic substance, is for sealing a clearance between the boss portion and the cover member, and has an cylindrical portion made of an elastic substance and mountable on the boss portion, and a sealing portion formed integrally on the outer circumferential surface of the cylindrical portion and tapering toward the through-hole. A distal edge of the sealing portion is for contacting a contact surface in through-hole. The present invention provides a structure for sealing a spindle-form first member and, disposed about the outer periphery thereof, a second member, to seal while controlling impairment in rotational performance, without having to use components or space for fastening.

7 Claims, 9 Drawing Sheets

SEALING STRUCTURE FOR FISHING REEL

BACKGROUND OF THE INVENTION

1. Field of the Invention

This invention generally relates to sealing structures. More specifically, the present invention relates fishing-reel sealing structures that seal between a spindle-form first member and a second member disposed about the outer periphery of the first member in fishing reels.

2. Background Information

Because fishing reels such as spinning reels and dual-bearing reels are used in environments where they are constantly splashed with water, sealing structures are employed in fishing-reel applications for preventing water from encroaching interiorly. In particular, rings and oil-seals have been in widespread use conventionally for sealing in between relatively rotatable shaft members and their encompassing members. O-rings and oil-seals are used, for example, on the outer side of handle-carrying bearings in spinning reels or in between cover members and the spool shafts in dual-bearing reels.

In conventional O-ring based sealing structures, the O-rings are slightly squashed in order to form a seal. This means that the contacting surface area of the O-rings is extensive, and in particular, where the two members are relatively rotatable, the O-rings make the rotational resistance large, which tends to impair the rotational performance.

Oil seals are generally composed of a lip made of rubber, and a shape-retaining backing member made of metal. Accordingly, with oil-seal based sealing structures, because the contacting part is a peaked lip shape, it is comparatively easy to curb degradation in rotational performance. However, oil seals cannot be extended/contracted due to the backing member made of metal, and therefore fastening members and a space for fixing the oil-seal are necessary, which increases the axial space required to accommodate the oil seals.

In view of the above, there exists a need for sealing structure which overcomes the above mentioned problems in the prior art. This invention addresses this need in the prior art as well as other needs, which will become apparent to those skilled in the art from this disclosure.

SUMMARY OF THE INVENTION

An object of the present invention is to provide a structure for sealing a spindle-form first member and a second member disposed about the outer periphery thereof, to seal without having to use components or space for fastening, while curbing rotational-performance impairment.

A fishing-reel sealing structure having is furnished with a fishing-reel, spindle-form first member, a second member, and a seal member. The second member has an inner peripheral surface disposed about the first member outerperipherally, and is rotatable relative to the first member. The seal member, a component made of an elastic substance, seals the clearance between the two members, and has: an elastic-manufacture cylindrical portion mountable on the first member; and a sealing portion formed integrally on the outer circumferential surface of the cylindrical portion, and tapering toward the inner peripheral surface of, and whose distal edge is for contacting on, the second member.

In this sealing structure, the cylindrical portion of the seal member made of an elastic substance is fitted to the spindle-form first member, and bringing the tapered sealing portion into contact with the inner circumferential surface of the second member seals the clearance between the two members. Herein, the fact that the tapered sealing portion is brought into contact with the second member to seal the clearance between the two members means that the surface area of the places in contact is smaller, making degradation in rotational performance unlikely. Likewise, that fact that, like O-rings, the seal member is entirely made of an elastic substance makes it extendable/contractible, which means that, for example, it may be fastened to the first member simply by fitting its cylindrical portion into a groove. Components and space for fastening the seal member are therefore made unnecessary.

Preferably, an annular groove is formed in a first-member outer circumferential surface that opposes the second member, and the cylindrical portion is fitted into the annular groove. In this case, the seal member may be fastened to the first member just by stretching the cylindrical portion and fitting it into the first member, and set that way shifting axially to mount the seal member in the annular groove.

Preferably, the part of the sealing portion for contacting the second member is a lip inclined heading outward of the first member. In this case, the fact that the sealing portion is a lip inclined heading outward of the first member means that when mounting the first member from without, the second member will not reverse even though it contacts the sealing portion. Moreover, since the fore end of the sealing portion is oriented outward, though liquids enter from without, the liquids are not likely to encroach interiorly.

Preferably, the first member is a constituent of a lever-drag mechanism in a lever-drag-type dual-bearing reel having a line-winding spool, and therein is a stationary component immovable in the axial direction of the spool; and the second member is a constituent of the lever-drag mechanism that is rotatable relative to the first member, and therein is a shifting member for shifting in the axial direction of the spool. In this case, utilizing the spool member also in a lever-drag mechanism curbs degradation in rotational performance when the spool spins freely.

Preferably, the first member is a drag disk capable of braking the spool, and rotates linked to a spool shaft passing through the spool center; and the second member is a cover member for covering the drag disk, and rotates linked to the spool and meanwhile shifts in the axial direction together with the spool and the spool shaft. In this case, fluctuations in drag force may be controlled by sealing the clearance between the cover member and the drag disk.

Preferably, the drag disk has a boss portion passing centrally through the cover member; the seal member is fitted to the boss portion; and a contact face for the seal to contact and a relief face the seal does not contact are formed, ranged in the spool axial direction, superficially on the inner rim of the cover member. In this case, relative axial movement between the drag disk and the cover member brings the sealing portion of the seal member into contact with/parts it from the cover member. This allows for specific conditions whereby the sealing portion does not contact the cover member so as not to impair the rotational performance.

Preferably, the sealing portion of the sealing member: parts away from the cover member to oppose the relief face, when the drag disk in its brake-release state parts away from the spool; and comes into opposition with, to contact on, the contact face when the drag disk in its braking state contacts the spool. In this case, the fact that the during the brake-release state the sealing portion is opposite the relief face, where it is parted off the cover member, means it does not impair rotational performance when the spool spins freely, and lets fishing line be reeled out agilely though a seal member is installed. Likewise, during the braking state, the sealing portion seals positively by coming into contact with the contact face of the cover member.

Preferably, the spool has a bobbin-trunk portion, and flange portions arranged on either end of the bobbin-trunk portion; and the outer diameter of the sealing portion is 8% or more and 50% or less of the outer diameter the flange portions. In this case, the fact that the outer diameter of the sealing portion is 50% or less that the outer diameter of the flange portions means that the contacting surface area of the sealing-member sealing portion is sufficiently small with respect to the spool, which curbs degradation in rotational performance though the seal member is brought into contact with the second member. Likewise, the fact that the outer diameter of the sealing portion is 8% or more lets strength of the spool shaft be sustained with the seal member fitted into a first member mounted encompassing the spool shaft.

Preferably, the first member is a handle spindle fitted detachably and reattachably to a spinning-reel master-gear shaft; and the second member is a reel body rotatively carrying the master-gear shaft. In this case, impairment in rotational performance of the spinning-reel handle may be controlled; meanwhile in either case where the handle is fitted on through the left or the right, sealing either end of the master gear shaft may be accomplished with a single seal member.

A fishing-reel sealing structure is furnished with a fishing-reel, spindle-form first member, a second member, and a seal member. The second member has an inner peripheral surface disposed about the first member outer-peripherally, and is rotatable relative to the first member. The seal member, a component made of an elastic substance, seals the clearance between the two members, and has: an elastic-manufacture cylindrical portion mountable on the second member; and a sealing portion formed integrally on the inner circumferential surface of the cylindrical portion and tapering toward the outer circumferential surface of the first member, and whose distal edge is for contacting on the first member.

In this sealing structure, the cylindrical portion of the seal member made of an elastic substance is fitted to the second member, and bringing the tapered sealing portion into contact with the outer circumferential surface of the first member seals the clearance between the two members. Herein, the fact that the tapered sealing portion is brought into contact with the first member to seal the clearance between the two members means that the surface area of the contacting places is smaller, making degradation in rotational performance unlikely. Likewise, that fact that, like O-rings, the seal member is entirely made of an elastic substance makes it extendable/contractible, which means that, for example, it may be fastened to the second member simply by fitting its cylindrical portion into a groove. Components and space for fastening the seal member are therefore made unnecessary.

These and other objects, features, aspects and advantages of the present invention will become apparent to those skilled in the art from the following detailed description, which, taken in conjunction with the annexed drawings, discloses a preferred embodiment of the present invention.

BRIEF DESCRIPTION OF THE DRAWINGS

Referring now to the attached drawings which form a part of this original disclosure:

FIG. 1 is a side view of the lever-drag reel in accordance with the first embodiment;

DETAILED DESCRIPTION OF THE PREFERRED EMBODIMENTS

Embodiment 1

Figure 1:
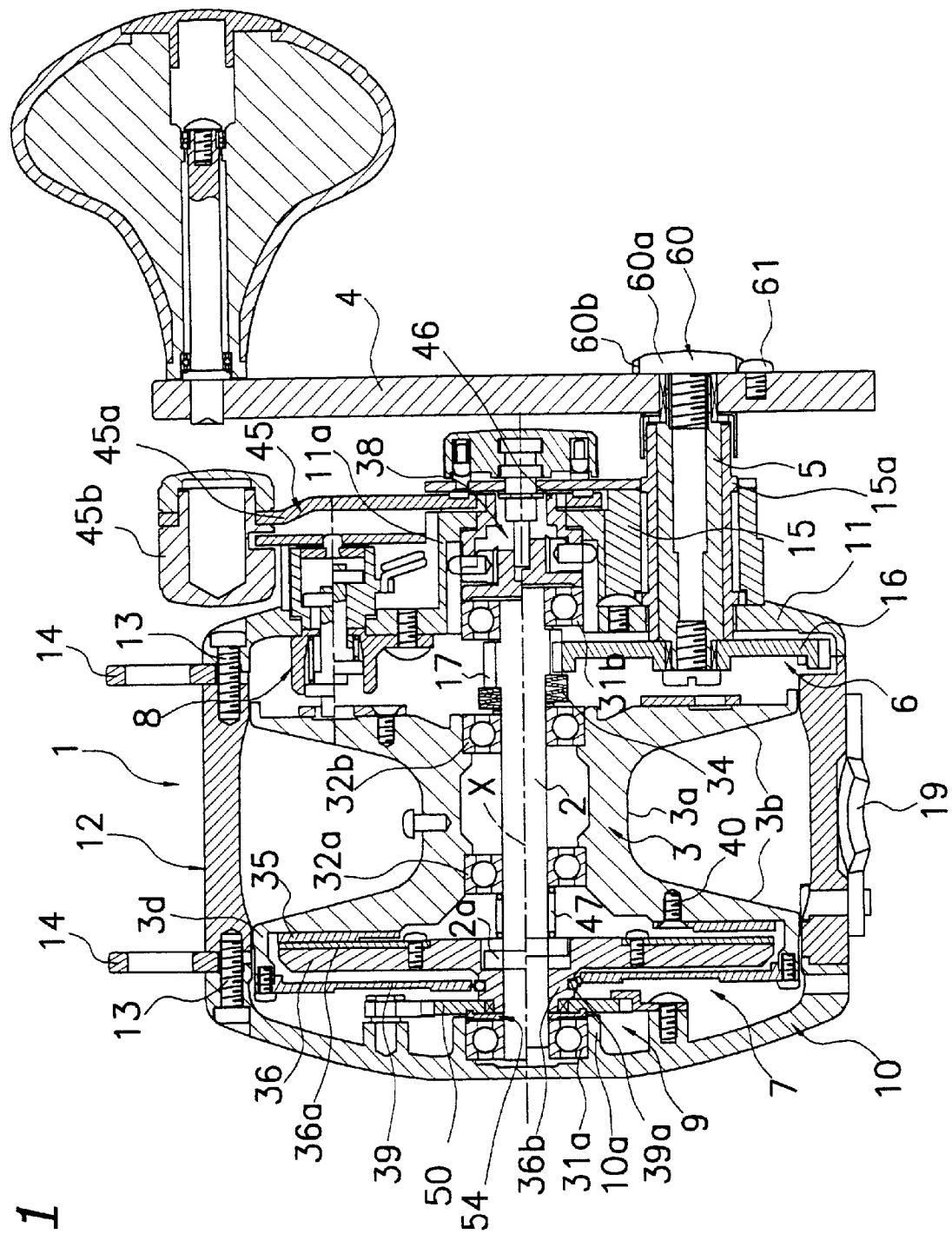
FIG. 1 is a cross-sectional view of a lever-drag reel in accordance with the first embodiment of the present invention.

As seen in FIG. 1, a dual-bearing reel into which Embodiment 1 of the present invention is adapted is a lever-drag reel, and is furnished with: a cylindrical reel unit 1; a spool shaft 2, rotatively fitted in the central portion of the reel unit 1; a spool 3, carried rotatively yet axially immovably on the spool shaft 2; and a handle 4, disposed sideways on the reel unit 1. Likewise, within the reel unit 1 interior, the lever-drag reel is furnished with: a torque-transmitting mechanism 6 that transmits torque from the handle 4 to the spool 3; a lever-drag mechanism that brakes rotation of the spool 3 in the line-reel-out direction; a spool locking mechanism 8 that locks the spool 3, and a anti-reverse mechanism 9 that controls rotation of the lever-drag mechanism 7 in the line-reel-out direction.

Reel Body Configuration

The reel unit 1 has: a left/right pair of plate-shaped side plates 10, 11 made of metal; and a perforated cylindrical reel unit 12, made of metal, to either end of which the side plates 10, 11 are joined coaxially by spigot joints and fastened by a plurality of fixing screws 13. Harness lugs 14 of a pair, used for supporting the reel with the body, are mounted in between the side plates 10, 11 and the reel unit 12. The approximately central portions of the side plates 10, 11 rotatively support either end of the spool shaft 2. A cylindrical bearing accommodating portion 10a that protrudes inward is formed in the central portion of the inside face of the left side plate 10. A boss 11a protruding axially outward is formed in the central portion of the right side plate 11 (handle 4 side) for supporting the spool shaft 2; and on the periphery of the boss 11a, a thick-walled, disk-shaped bearing block 15 for mounting the handle shaft 5 of the handle 4 is screwed fast. The under portion of the reel unit 12 is provided with a rod attachment part 19 for mounting the reel onto a fishing rod.

Configuration of Spool and Spool Shaft Environs

By a pair of left and right bearings 31a, 31b disposed at either end, the spool shaft 2 is rotatively supported in the side plates 10 and 11 on the reel unit 1. Also, spaced axially inward thereof are two bearings 32a, 32b disposed at either end of the spool 3, by which the spool 3 is rotatively supported. The bearing 31a on the left side is accommodated by the bearing accommodating portion 10a formed on the left side plate 10. The bearing 31b on the right side is mounted in the boss 11a formed on the right side plate 11. The components of a drag-shifting mechanism 38 (described later) for the lever-drag mechanism 7 adjoins the right side of the bearing 31b outer race on the right end of the spool shaft 2. Additionally, a pinion gear 17 (described later) for the rotation transmission mechanism 6 adjoins the left side of the bearing 31b inner race. The anti-reverse mechanism 9 adjoins the right side of the bearing 31a inner race on the left end of the spool shaft 2. Further, the inside face of the side plate 10 abuts the left end of the outer race. The spool 3 abuts on the left side of the outer race of the right-side bearing 32b that supports the spool 3. Further, four disk springs 34 abut on the right side of the inner race via a washer (not shown). The disk springs 34 are provided in order to make the drag force adjustable over a broad range with respect to pivot of the brake operating lever (described below), without the drag force elevating abruptly. A later described friction disk 36 in the lever-drag mechanism 7 via a return spring 47 abuts on the left side of the inner race of the left bearing 32a that supports the spool 3. The right side of the outer race abuts on the spool 3.

The spool 3 has a bobbin trunk 3a, and flanges 3b that are formed integrally with the bobbin trunk 3a on either end. The spool-locking mechanism 8, which allows the spool 3 to rotate in the line-retrieving direction and locks it from rotating in the line-reel-out direction, is provided outward of the flange 3b on the right side (handle-mounting side) in FIG. 1. Further, a brake disk 35 for the lever-drag mechanism 7 is mounted outward of the flange 3b on the left side in FIG. 1. The outer periphery of the left flange 3b is formed into a cylindrical portion 3d extending outward in the spool shaft direction, for attaching a cover 39 for covering the brake disk 35.

Figure 2:
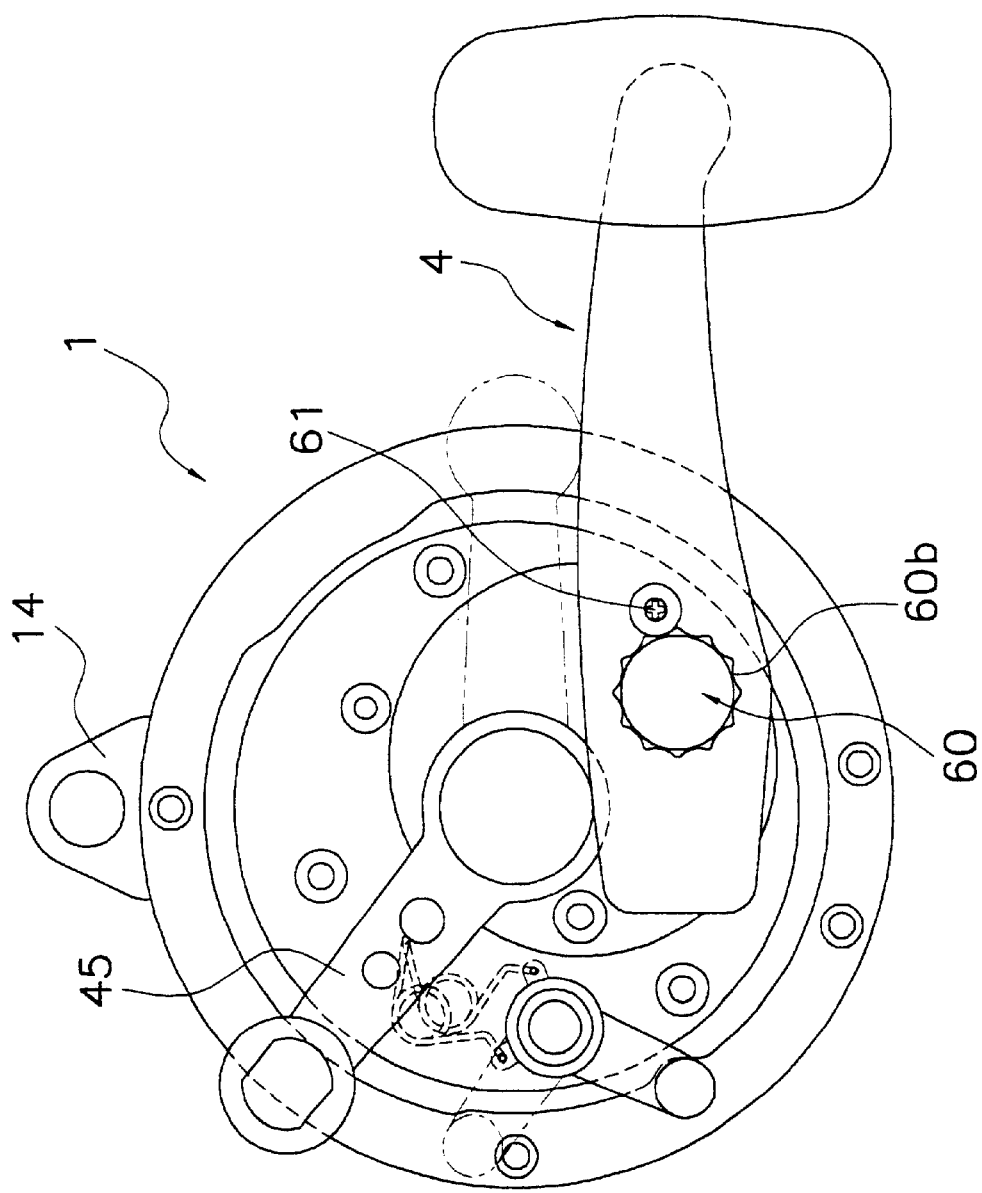

The handle 4, as shown in FIGS. 1 and 2, is fastened by a fixing screw 60 to the projecting end of the cylindrical handle shaft 5, which is disposed beneath the spool shaft 2, and parallels the spool shaft 2. A brim 60a is formed on the fixing screw 60. Twelve round-arcuate depressions 60b spaced at circumferential intervals are formed on the brim 60a, which is locked in place by a screw 61, the head of which engages a recess 60b. The handle shaft 5 is rotatively mounted in a cylindrical member 15a inserted into the bearing block 15 frontward below the boss portion 11a. A main gear 16 is mounted non-rotatably on the tip of the handle shaft 5.

As shown in FIG. 1, the rotation transmission mechanism 6 includes: the main gear 16, which is carried rotatively by the handle shaft 5 for the handle 4; and the pinion gear 17, which is formed unitarily with the spool shaft 2. Rotation from the handle 4 is transmitted to the spool shaft 2 via the handle shaft 5, the main gear 16, and the pinion gear 17.

Lever-Drag Mechanism Configuration

The lever-drag mechanism 7 as shown in FIG. 1 includes: the brake disk 35, which is mounted on the outside face of the FIG. 1 left-side flange 3b on the spool 3; the friction disk 36, for contacting the brake disk 35; and the drag-shifting mechanism 38, which is for reciprocatingly shifting the spool 3 and the friction disk 36 in the spool axial direction.

The brake disk 35 is for example a washer-shaped disk member made of stainless steel, and is mounted non-rotatably with respect to the spool 3 on the outside face of the left-side flange 3b on the spool 3 by means of a diametrically inward plurality of attaching screws 40 disposed on the lateral surface and spaced at circumferential intervals.

The friction disk 36 is disposed opposing the brake disk 35. A ring-shaped friction plate 36a made of abrasion-resistant material, e.g., carbon graphite or fiber-reinforced resin, is fastened to the surface of the friction disk 36 that opposes the brake disk 35, by a suitable fastening means, such as screws. In the central portion of the friction disk 36 is a cylindrical boss portion 36b that protrudes axially outward; and a pin 2a, which is fitted into the spool shaft 2, passing through the spool shaft 2 diametrically, interlocks with the boss portion 36b. Accordingly, the friction disk 36 is mounted on the spool shaft 2 non-rotatably, and rotates together with the spool shaft 2. Further, a ratchet wheel 50 in the anti-reverse mechanism 9 is fitted, non-rotatably yet free to shift axially, to the FIG. 4 left-end surface of the boss portion 36b on the friction disk 36. Additionally, a cover member 39 covers the friction disk 36. Likewise, the boss portion 36b on the friction disk 36 passes through the cover member 39 and extends toward the bearing 31a.

Figure 3:
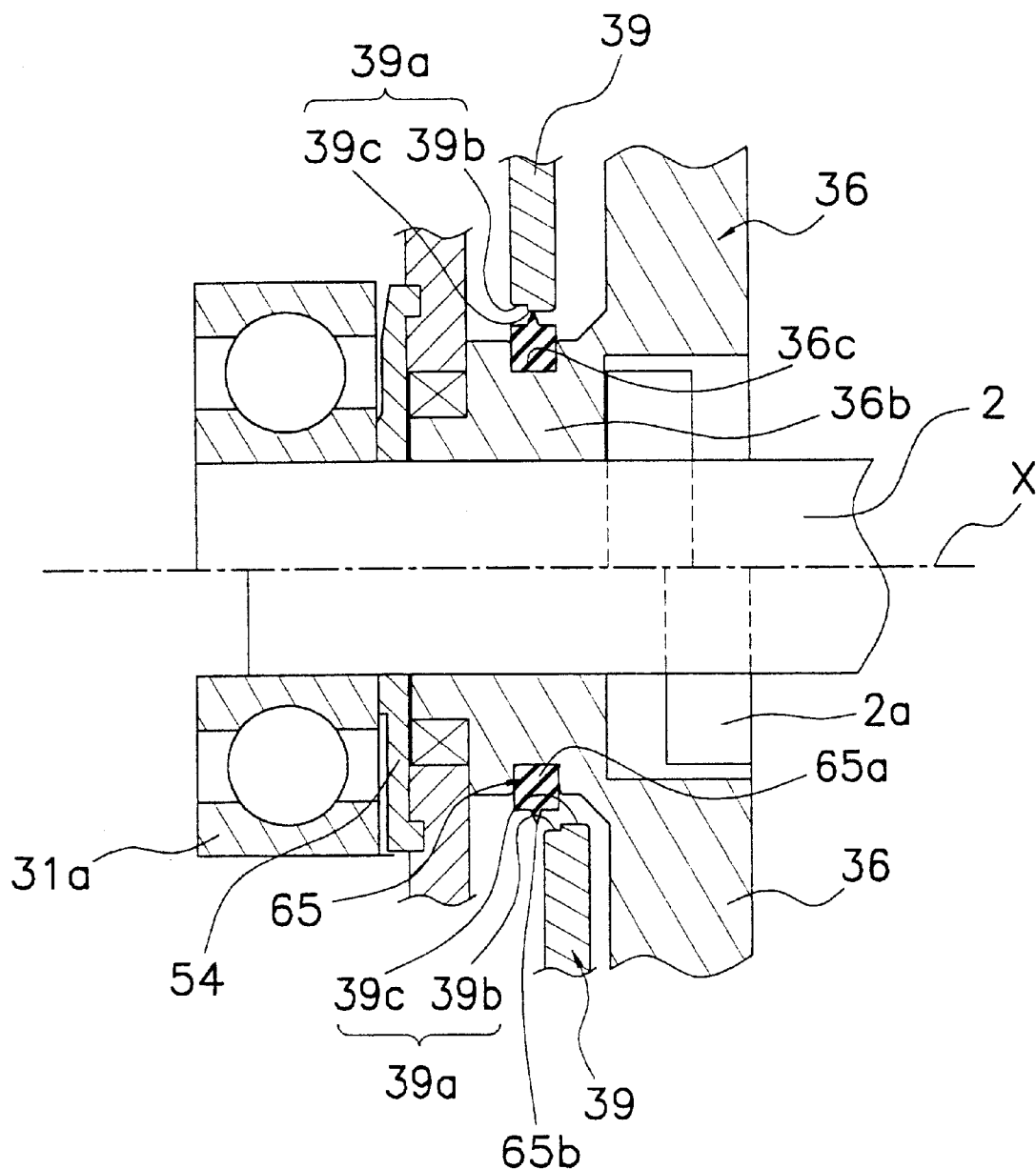
FIG. 3 is an enlarged cross-sectional view of sealing section for cover member.

The cover member 39, a disk-shaped component in the center of which is a through-hole 39a through which the boss portion 36b on the friction disk 36 passes, is fastened along its outer periphery to the cylindrical portion 3d of the spool 3 by a plurality of bolts. As shown in FIG. 3, a seal member 65 is interposed between the through-hole 39a in the cover member 39, and the boss portion 36b on the friction disk 36, for preventing liquids from invading through the clearance between them into the interior. The through-hole 39a has a larger-diameter relief face 39b situated axially outward, and disposed axially inward in proximity thereto, a smaller-diameter contact face 39c.

The seal member 65 is fitted into a seal-attachment portion 36c consisting of an annular groove formed in the outer circumferential surface of the boss portion 36b. The seal member 65 is a component made of an elastic substance such as NBR, for example. The seal member 65 includes: an elastic-manufacture cylindrical portion 65a that can be fit into the seal-attachment portion 36c; and a sealing portion 65b formed integrally with the cylindrical portion 65a on its outer circumferential surface, tapered toward the inner circumferential surface of the through-hole 39a, and whose distal edge is capable of contacting on the cover member 39. The cylindrical portion 65a is a ring-shaped section that is rectangular in cross-section; while the sealing portion 65b is a section that extends diametrically from the outer circumferential surface of the cylindrical portion 65a, toward the through-hole 39a. The tapered distal-edge part of the sealing portion 65b is peaked, and can come into contact with the contact face 39c of the through-hole 39a, whereas it cannot come into contact with the relief face 39b.

The outer diameter of the sealing portion 65b is 8% or more, 50% or less of the outer diameter of the flanges 3b of the spool 3, and preferably is 10% or more, 20% or less. In this case, because the outer diameter of the sealing portion 65b is 50% or less than the outer diameter of the flanges 3b, the contacting surface area of the sealing portion 65b is made sufficiently small with respect to the spool 3, which curbs degradation in rotational performance of the spool 3 though the spool 3 is brought into contact with the seal member 65. Likewise, because the outer diameter of the sealing portion 65b is 8% or more, the spool shaft 2 can have a large diameter. Therefore, even with a seal member 65 fitted into the friction disk 36 mounted encompassing the spool shaft 2, the diameter of the spool shaft 2 will be large enough to sustain the strength of the spool shaft 2.

The distal edge of this sealing portion 65b opposes the relief face 39b when the spool 3 is in the brake-release state-(portion downward from the spool center axis X in FIG. 3) situation—and is out of contact with the cover member 39. Likewise, when in the braking state—(portion upward from the spool center axis X in FIG. 3) situation—it opposes the contact face 39c and contacts the through-hole 39a in the cover member 39 to seal the clearance between the cover member 39 and the friction disk 36.

Sealing the inner portion of the cover member 39 with the seal member 65 as such makes the friction disk unlikely to become water-wet, which keeps the drag performance from fluctuating. Likewise, the fact that the tapered sealing portion 65b is brought into contact with the contact face 39c to seal the clearance between the boss portion 36b and the cover member 39 means that the surface area of the places in contact is small, and that the rotational performance is unlikely to deteriorate. Moreover, since, like O-rings, the seal member 65 is entirely made of an elastic substance it is extendable/contractible, which means that it may be fastened to the seal-attachment portion 36c simply—just by stretching the cylindrical portion 65a to fit it into the boss portion 36b, and shifting it axially. Components and space for fastening the seal member 65 are therefore made unnecessary.

The anti-reverse mechanism 9 is a ratchet-type one-way clutch that includes: a ratchet wheel, and a pair of ratchet pawls (not illustrated) whose tips interlock with the ratchet wheel 50, and which are disposed outer peripherally about the ratchet wheel 50. A spacer element 54 is fitted in between the ratchet wheel 50 and the bearing 31a inner race, contacting the two.

The friction disk 36 cannot shift in the spool axially outward direction (FIG. 1 leftward), i.e., in the direction parting away from the brake disk 35; and meanwhile it is permitted by the anti-reverse mechanism 9 to rotate in the line-retrieving direction, but prohibited from rotating in the line reel-out direction.

Herein, in the brake-released state as shown on the lower side of the spool axis X in FIG. 1, a gap opens between the friction plate 36a on the friction disk 36, and the brake disk 35; and in the braking state as shown on the upper side of the spool axis X in FIG. 1, the two adhere. The drag force is changed by adjusting the degree of adherence.

As shown in FIG. 1, the drag-shifting mechanism 38 includes: a brake-handling lever 45 provided pivotally on the reel unit 1; a pressing mechanism 46, which, in response to pivoting the brake-handling lever 45 clockwise in FIG. 2, presses against the spool 3 and the brake disk 35 and shifts them FIG. 3 leftward; and a return spring 47, which is disposed between the friction disk 36 and the spool 3, and shifts the spool 3 rightward in FIG. 1 in response to the brake-handling lever 45 moving FIG. 2 counterclockwise.

The brake-handling lever 45 is mounted to the reel unit 1 free to pivot between the brake release position, indicated by solid lines in FIG. 2, and the maximum braking position, indicated by phantom lines. The brake-handling lever 45 includes a lever portion 45a that is pivotally mounted to the boss portion 11a, and a knob portion 45b that is fastened to the fore end of the lever portion 45a. The basal end of the lever portion 45a interlocks non-rotatably with the pressing mechanism 46.

Lever-Drag Mechanism Operation

The following explains the braking function of the lever drag mechanism 7.

In the lever drag mechanism 7, when the brake handling lever 45 is pivoted from the braking position, indicated by phantom lines in FIG. 2, into the brake release position, indicated by solid lines, the state shown above is switched into the state shown on the lower side of the spool axis X in FIG. 1. Initially the spool 3 is pressed by the urging force of the return spring 47 and shifted FIG. 1 rightward. A gap thereby opens between the brake disk 35 and the friction disk 36. The spool 3 is further pressed via the bearing 32a and shifted rightward. This releases the braking on the spool 3. Meanwhile when the spool 3 shifts, the pressing mechanism 46 is pressed via the bearing 32b, the disk springs 34, the pinion gear 17, and the bearing 31b, and retreats FIG. 1 rightward. Then, when the brake-handling lever 45 is pivoted into the brake release position, there is a shift into the state shown on the lower side of the spool axis X in FIG. 1. This consequently brings the sealing portion 65b of the seal member 65 opposite the relief face 39b, as shown on the lower side of the spool axis X in FIG. 1, where rotational resistance due to the seal member 65 when the spool 3 is in its free-rotation state will not arise, which lets the line pay out smoothly from the spool 3 so that the fishing line reel outs agilely.

On the other hand, when the brake handling lever 45 is pivoted from the brake release position indicated by solid lines in FIG. 2, into the braking position indicated by phantom lines, the state shown on the lower side is switched into the state shown on the upper side of the spool axis X in FIG. 1. Initially, pivoting the brake handling lever 45 shifts the pressing mechanism 46 leftward in the spool axial direction. This presses on and shifts the outer race of the bearing 31b, and the spool 3 is pressed via the pinion gear 17, the disk springs 34, and the bearing 32b and shifted leftward in the spool axial direction (FIG. 1 leftward). Consequently, the brake disk 35 also shifts leftward axially, whereby the brake disk 35 is brought near the friction disk 36. Then, when the brake disk 35 comes into contact with the friction disk 36, which is axially immovable and non-rotatable in the line reel-out direction, drag force acts on the spool 3. When the brake handling lever 45 is then pivoted to the maximum pivotal position, pressing force is maximized and the friction disk 36 pressing on the brake disk 35 yields large drag force. In this situation, as shown on the upper side of the spool axis X in FIG. 3, the sealing portion 65b of the seal member 65 is brought opposite and into contact with the contact face 39c whereby the seal member 65 when the spool 3 is in the braking state seals the clearance securely to lessen fluctuations in drag performance. What is more, the fact that the surface area in which the distal edge of the sealing portion 65b contacts the contact face 39c is small means little increase in rotational resistance, so that rotational performance is unlikely to be impaired.

Meanwhile, when a fish is caught on the terminal tackle and the spool 3 spins in the line reel-out direction, the ratchet wheel 50 is prohibited from rotating in the line reeling-out direction. Consequently the friction disk 36 is prevented from rotating in the line reeling-out direction, and the set drag force acts on the spool 3.

Embodiment 2

Overall Configuration

In the foregoing Embodiment 1, an embodiment in which a sealing structure having to do with the present invention is adopted in a lever-drag type dual-bearing reel was illustrated, but herein an embodiment in which it is adopted in a spinning reel will be explained.

Figure 4:
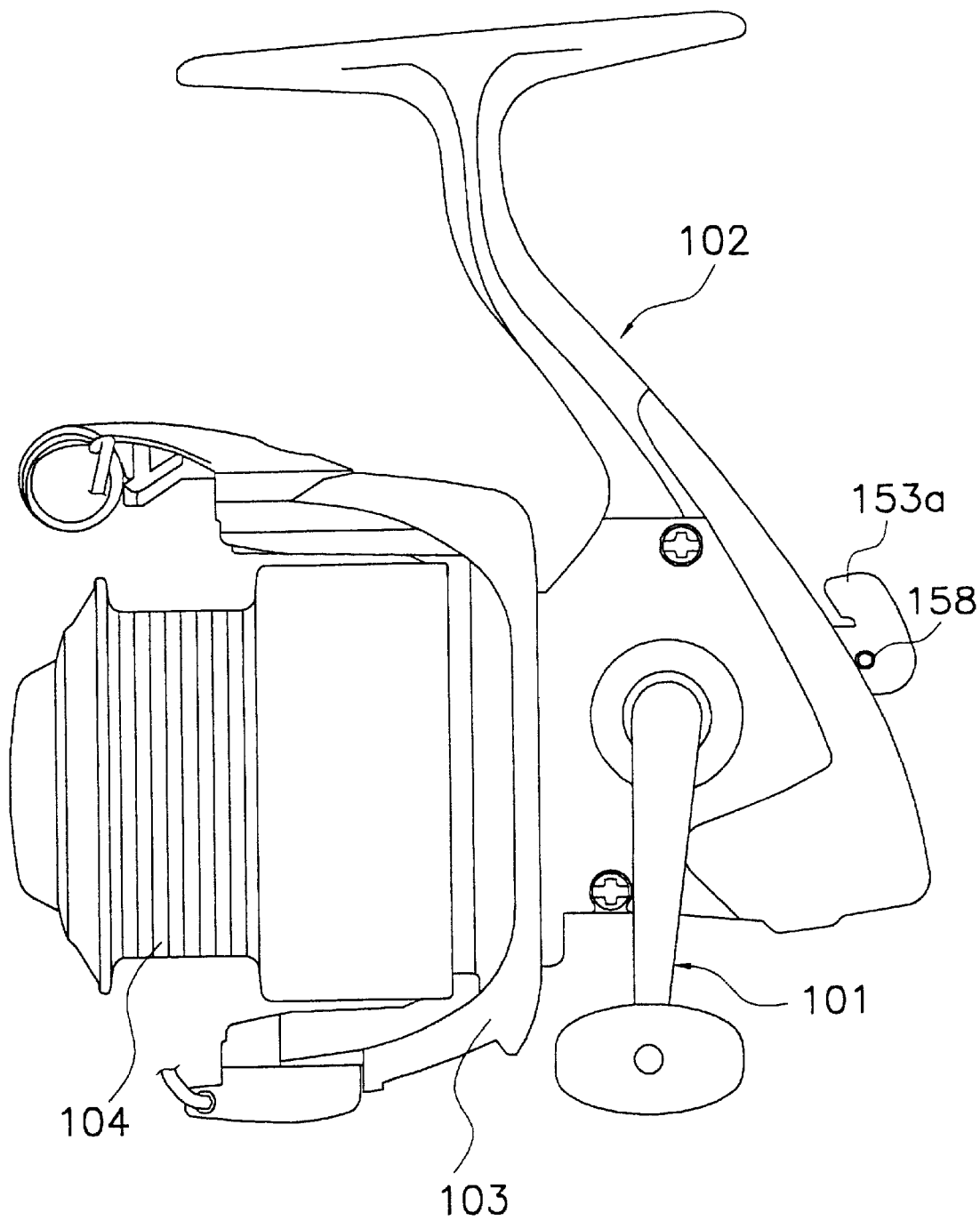
FIG. 4 is a left-side view of a spinning reel in accordance with the second embodiment of the present invention.

Set out in FIG. 4, a spinning reel in which a second embodiment of the present invention is adopted is furnished with: a reel unit 102 that is mountable on a fishing rod, a handle assembly 101 that fits rotatively onto the reel unit 102 about left/right shafts, a rotor 103, and a spool 104. The rotor 103 rotates linked to rotation of the handle assembly 101, wherein it guides fishing line onto the spool 104, and is rotatively carried on the front of the reel unit 103, turning about a front-to-rear axis. The spool 104 is for winding fishing line guided by the rotor 103 onto its outer circumferential surface, and is disposed on the front of the rotor 103, where it is let shift reciprocatingly in the front-to-rear axial direction.

Reel Unit Configuration

Figure 6:
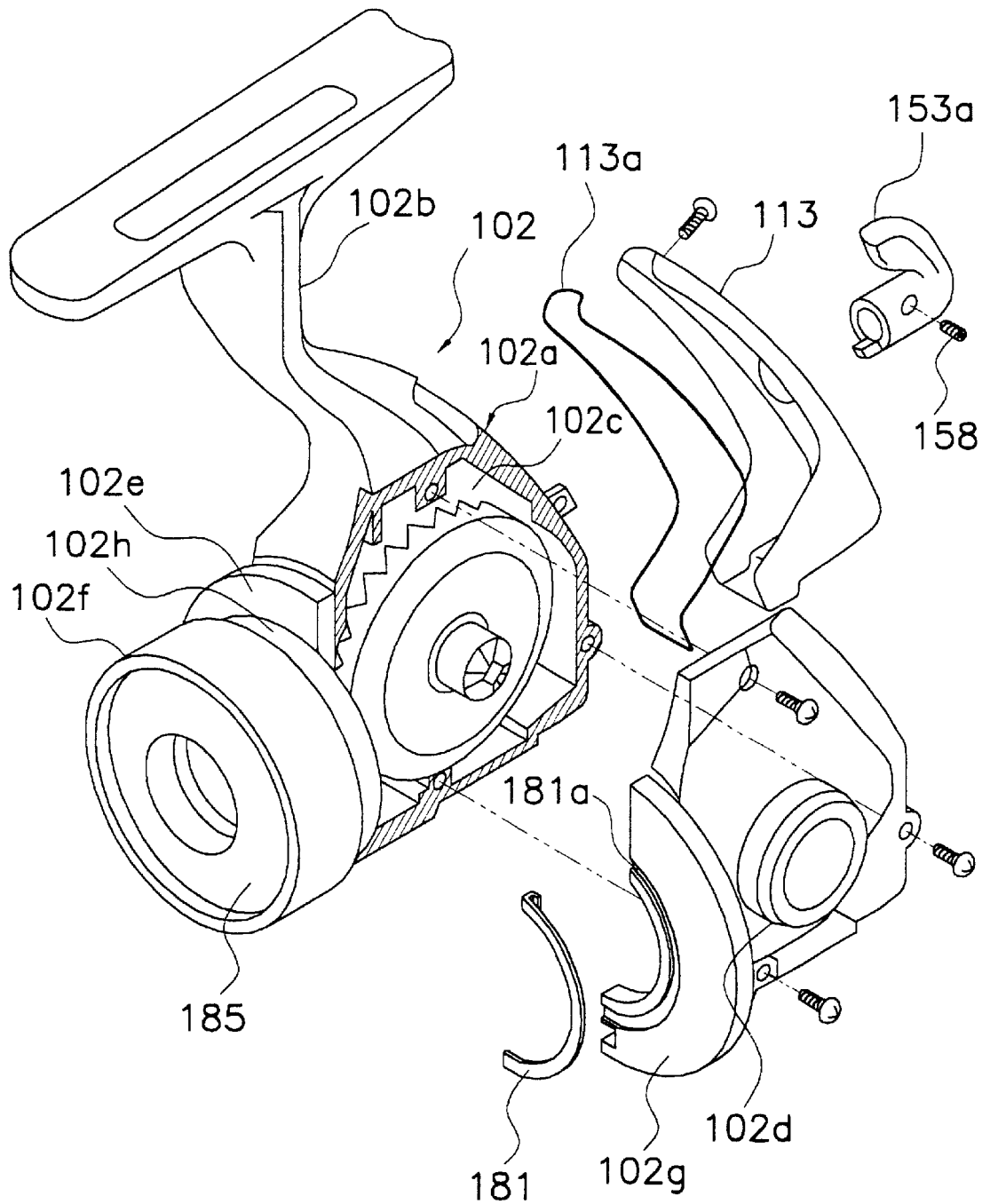
FIG. 6 is an exploded perspective view of reel unit in accordance with the second embodiment.

As shown in FIG. 6, the reel unit 102 includes: a reel body 2a constituting the main portion of the reel unit 102 and in the side of which is an opening 102c; a T-shaped rod-attachment leg 102b integral with and extending diagonally upward and forward from the reel body 102a; and a cover member 102d that is screwed fast onto reel body 2a to shut the opening 102c.

Figure 5:
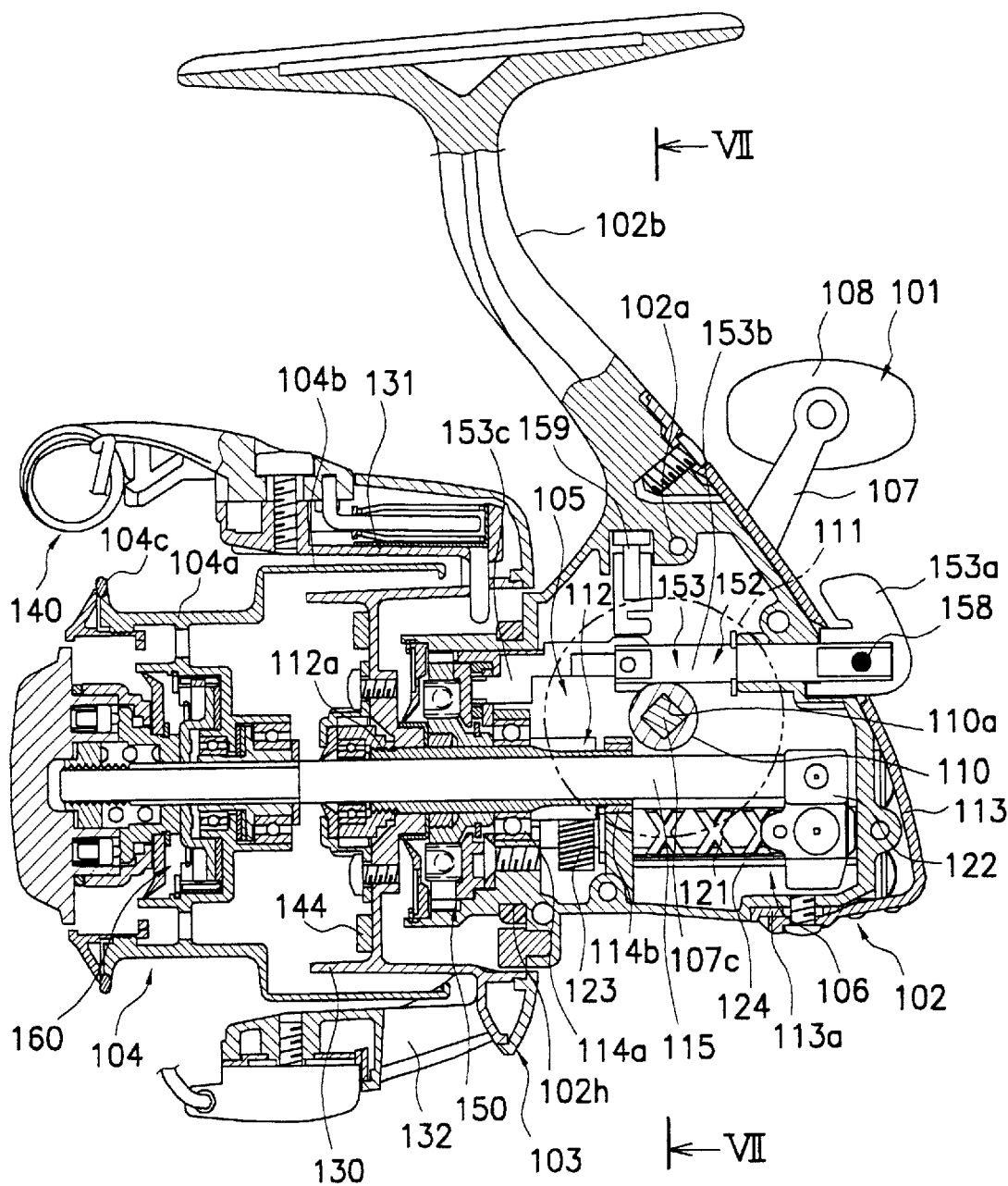
FIG. 5 is a left-side cross-sectional view in accordance with the second embodiment.

The reel body 102a in the interior has a mechanism-mounting space ranging to the opening 102c. Provided in the space are, as shown in FIG. 5: a rotor drive mechanism 105 that, linked to rotation of the handle assembly 101, rotates the rotor 103; and an oscillating mechanism 106 that pumps the spool 104 back and forth to wind on fishing line uniformly.

As shown in FIG. 6, a first flange portion 102e, and a cylindrical portion 102f projecting forward from the first flange portion 102e are formed on the front of the reel body 102a. The first flange portion 102e has an approximately semicircular contour as though missing a section consisting of a chord and a circular arc, and is formed standing on the front end of the aperture 102c. The cylindrical portion 102f is a circular cylindrical section in the interior of which is mounted, as shown in FIG. 5, a one-way clutch 151 to an anti-reverse mechanism 150 for prohibiting/releasing rotation (reversal) of the rotor 103 in the line reel-out direction. A channel portion 102h, D-shaped viewed in cross-section, is formed on the rear end, at a slightly smaller diameter than the rest, of the cylindrical portion 102f; and the area on the rear face of the channel portion 102h where the cover member 102d is mounted communicates with and opens onto the aperture 102c.

A second flange portion 102g that is shaped into an approximately semicircular contour consisting of the chord and circular arc from the missing section of the first flange portion 102e is formed at the front end of the cover member 102d. A waterproofing seal 181 made from an elastic substance is fitted into the surface of the second flange portion 102g where it contacts the first flange portion 102e and the rear surface of the cylindrical portion 102f, for sealing the gaps therewith. The waterproofing seal 181 is formed into a band shape in an approximately semicircular arc that extends from the front surface to the rear surface of the second flange portion 102g, and continues in locations opposite the surface where the second flange portion 102g contacts the first flange portion 102e and the surface where it contacts the rear face of the channel portion 102h. The waterproofing seal 181 is fitted into an approximately semicircular arcuate mounting groove 181a formed on the front face of the second flange portion 102g.

Figure 7:
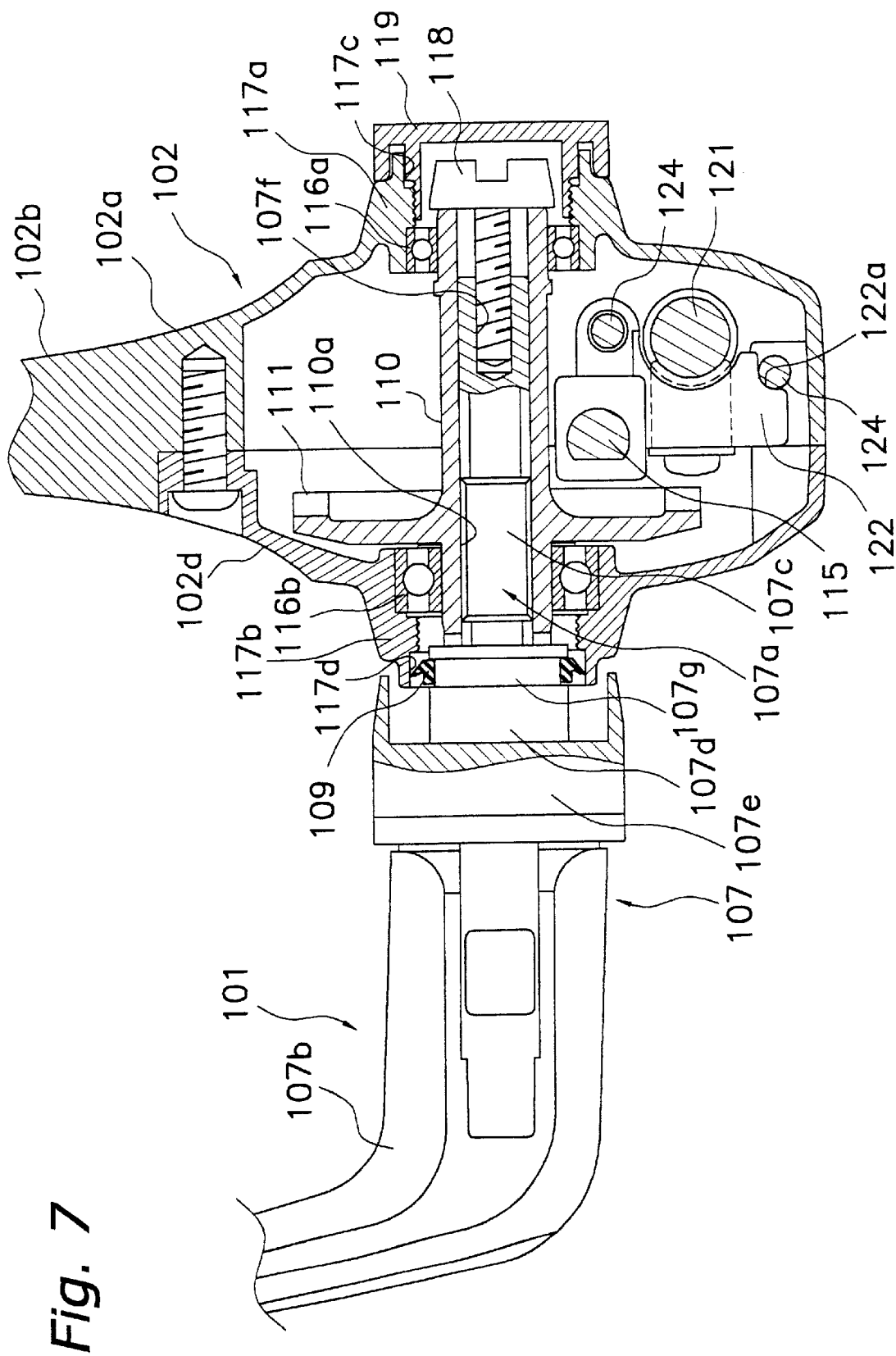
FIG. 7 is a partial cross-sectional view of the handle assembly and the reel body viewed through the line VII—VII in FIG. 5.

As shown in FIG. 7, a cylindrical boss portion 117a is formed on the right lateral surface of the reel body 102a. The boss portion 117a is formed protruding in/outward from the reel body 102a, for accommodating a bearing 116a that carries the right end of a master gear shaft 110. A boss portion 117b is formed in a position on the cover member 102d opposing the boss portion 117a. The boss portion 117b is formed projecting in/outward from the reel body 102a, for accommodating a bearing 116b that carries the left end of the master gear shaft 110. The boss portion that is opposite the side in which the handle 101 is fitted (the boss portion 117a in FIG. 7) is closed off by a waterproof cap 119. The waterproof cap 119 is a cylindrical cover having a base, and is fastened by screw-joining into the inner circumferential surface of either one of the boss portions 117a, 117b.

As shown in FIGS. 5 and 6, the rear of the reel unit 102 is covered by a protective cap 113 manufactured from, e.g., metal or a synthetic resin. The protective cap 113 is disposed to cover the reel unit 102 lower part and back surface, extending from beneath the reel body 102a and the cover member 102d across the back surface and further to the rod-mounting leg 102b. The protective cover 113 is removably/reattachably fastened to the reel unit 102 by screws. A spacer 113a made of a synthetic resin intervenes between the protective cover 113 and the reel unit 102. The spacer 113a is interposed to fill the gap between the protective cover 113 and the reel unit 102. By interposing a spacer 113a as such, though the protective cover 113 is manufactured from a synthetic resin, variations in the gap owing to discrepancies in its manufacture are absorbed.

Handle Assembly Configuration

The handle assembly 101 is a component that, as shown in FIG. 7, is detachably/reattachably fitted to the master gear shaft 110, and includes: a handle body 107, a grip portion 108 (see FIG. 5), and a seal member 109 fitted onto the handle body 107. The handle assembly 101 is attachable to the reel body 102 on either the right side (FIG. 4) or the left side (FIG. 5). The handle body 107 includes an mounting portion 107a fitted non-rotatably, detachably/reattachably to the master gear shaft 110, and an arm portion 107b that extends from the fore end of the mounting portion 107a in a direction intersecting the master gear shaft 110.

The mounting portion 107a includes: a handle shaft portion 107c, rectangular in cross section, that engages into a engagement hole 110a, rectangular in cross section, formed in the center of the master gear shaft 110; a flange portion 107d into which the handle shaft portion 107c is inserted, and with which it is thereby formed unitarily; and a shaft-collar portion 107e that is screwed into the flange portion 107d. A threaded hole 107f is cut in the distal end of the handle shaft portion 107c; and through the side opposite the end inserted into the master gear shaft 110, the handle body 107 is non-rotatably fastened to the master gear shaft 110 by screwing a fixing screw 118 into the threaded hole 107f. A seal-attachment portion 107g consisting of an annular groove is formed in the flange portion 107d in a location that allows it to oppose the inner circumferential surfaces 117c or 117d, of the boss portion 117a on the reel body 102a, or the boss portion 117b on the cover member 102d. The shaft-collar portion 107e is disposed so as to cover handle shaft portion 107c from without.

The arm 107b is collapsibly fitted to the fore end of the mounting portion 107a. The arm 107b is bent mid-course, where it extends in a direction that intersects the master gear shaft 110, and the grip portion 108 is fitted to its extended tip.

The grip portion 108 includes a grip shaft (not illustrated) crimp-fastened to the fore end of the arm 107b, and a T-shaped grip rotatively fitted onto the grip shaft.

The seal member 109 is for contacting on the inner circumferential surface of the boss portion 117a or 117b to seal the clearance between the boss portion 117a or 117b and the mounting portion 107a, and is made of an elastic substance such as NBR, for example. The seal member 109 is fitted detachably/reattachably to the mounting portion 107a. By fitting on this seal member 109, liquids may be prevented from invading into the bearing 116a or 116b.

Figure 8:
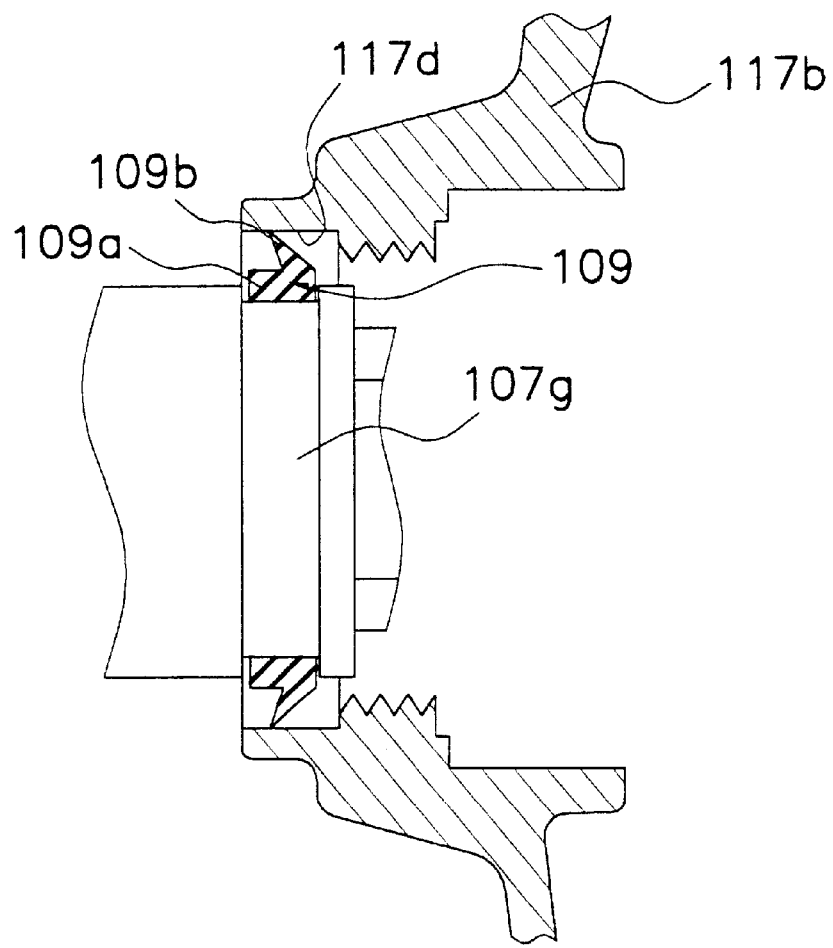
FIG. 8 is an enlarged cross-sectional view of sealing section for handle shaft.

The seal member 109, as shown in FIG. 8, has a cylindrical portion 109a, rectangular in cross-section, that fits into the seal-attachment portion 107g, and a sealing portion 109b that extends diametrically outward from the cylindrical portion 109a. The sealing portion 109b, whose distal edge pointedly tapers toward the inner circumferential surface of the boss portion 117a or 117b, is formed integrally with the cylindrical portion 109a. The part of the sealing portion 109b that contacts the inner circumferential surface is inclined heading outward of the reel body 102.

With the handle assembly 101 structured in this way, the handle assembly 101 is inserted into the engagement hole 110a, with the waterproof cap 119 taken off, through either the left/right of the master gear shaft 110. And by screwing in the fixing screw 118 through the end opposite the insertion side, the handle assembly 101 can be mounted on the master gear shaft 110 through either the left/right. When mounted, attaching the waterproof cap 119 to the boss portion on the side opposite the mounting side prevents liquids from invading interiorly from the side opposite; and on the mounting side moreover, the seal member 109 prevents liquids from invading interiorly. The exteriors of both the bearings 116a, 116b may therefore be sealed by the single seal member 109, which prevents liquids from invading into the master gear shaft 110 by a simple configuration without increasing the width of the reel unit 102.

Likewise, the fact the seal member 109 is fitted into the seal-attachment portion 107g consisting of an annular groove, enables preventing movement of the seal member 109 in the axial direction, without providing separate components and extra space. Further, the fact that the seal member 109 is made of an elastic substance lets it be fit into the seal-attachment portion 107g simply, by sliding the seal member 109 axially after it is fitted stretched like an O-ring onto the flange portion 107d. Moreover, the fact that the distal edge part of the sealing portion 109b that contacts the inner circumferential surfaces 117c, 117d of the boss portions 117a, 117b is tapered to a peak means that the resistance in contact with the inner circumferential surface 117c, 117d is small, which, by curbing increase in rotational resistance on the handle assembly 101, controls degradation in rotational performance. Likewise, because the sealing portion 109b from the very first is inclined heading outward, it will not become bent over backwards in fitting the handle assembly 101 into the master gear shaft 110 through the outer side of the reel unit 102. The handle assembly 101 may therefore be mounted into the master gear shaft 110 smoothly. Moreover, the fact that the contacting part of the sealing portion 109b is inclined heading outward, means that liquids are less likely to invade interiorly.

Rotor-Drive Mechanism Configuration

As shown in FIG. 5, the rotor drive mechanism includes a master gear 111 into which the handle assembly 101 is non-rotatably fitted, and a pinion gear 112 that meshes with the master gear 111.

The master gear 111 is a face gear, and is formed unitarily with the master-gear shaft 110. The master-gear shaft 110 is a hollow component made of, e.g., stainless steel, through the center of which the engagement hole 110a is formed; and either end thereof is rotatively supported via the bearings 116a, 116b in the reel body 102a and the lid member 102d.

The pinion gear 112, a cylindrical component, as shown in FIG. 5 is disposed running in the front-to-rear direction, and is fitted rotatively in the reel body 102a. The front portion 112a of the pinion gear 112 penetrates the center part of the rotor 103, and is fastened to the rotor 103 in the penetrated part by a nut 133. The pinion gear 112 is rotatively supported at the mid-portion and rear end in the axial direction via respective bearings 114a, 114b in the reel body 102a. A spool shaft 115 passes through the interior of the pinion gear 112. Along with meshing with the master gear 111, the pinion gear 112 also meshes with the oscillation mechanism 106.

Rotor Configuration

The rotor 103 includes a round cylinder portion 130 fastened to the pinion gear 112; first and second rotor arms 131, 132 opposing each other provided sideways on the round cylinder portion 130; and a bail arm 140 that guides fishing line onto the spool 104. The round cylinder portion 130 and the two rotor arms 131, 132 are, e.g., aluminum-alloy manufactured, and are formed unitarily.

Figure 9:
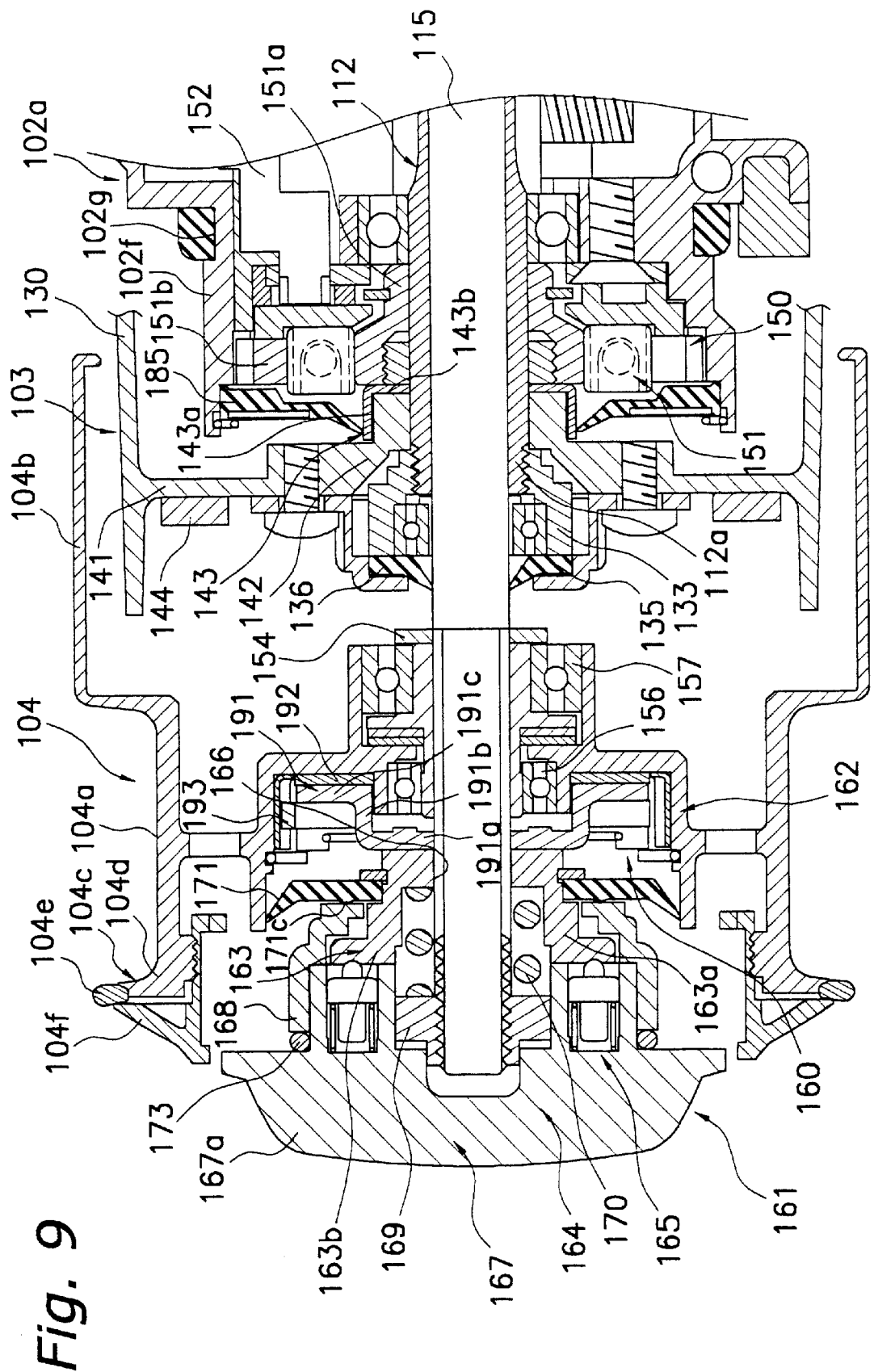
FIG. 9 is a partial cross-sectional view of spool and rotor center portion.

As shown in FIG. 9, a front wall 141 is formed on the front of the round cylinder portion 130, and a rearward-projecting boss 142 is formed in the center portion of the front wall 141. A through-hole into which the pinion gear 112 is non-rotatably interlocked is formed in the center of the boss 142; the front portion 112a of the pinion gear 112 and the spool shaft 115 penetrate the through-hole. An inertia-imparting ring 144 for imparting inertia to the rotor 103 is detachably/reattachably fitted onto the front face of the front wall 141 by screws (not illustrated). The inertia-imparting ring 144 is provided to regulate the change in rotational feel that goes along with lightening the weight of the rotor 103.

The nut 133 is screw-joined to the front portion 112a of the pinion gear 112, and thus the rotor 103 is fastened non-rotatably to the fore end of the pinion gear 12 by the nut 33. A bearing 135 is disposed along the inner periphery of the nut 133. The bearing 135 is furnished to secure the clearance between the spool shaft 115 and the inner surface of the pinion gear 112. A seal member 136 having a lip along its inner periphery is fitted onto the front face of the nut 133 and the bearing 135. The distal edge of the seal member 136 contacts on the spool shaft 115. This prevents liquids from permeating into the interior of the reel unit 102 from the spool shaft 15.

The aforementioned anti-reverse mechanism 150 is disposed neighboring the boss 142. As shown in FIG. 5, the anti-reverse mechanism 150 includes the one-way clutch 151, and a switching mechanism 152 that switches the one-way clutch 51 between an actuated state (reverse-prohibited state) and an non-actuated state (reverse-permitted state).

The inner race 151a of the one-way clutch 151, a roller-type one-way clutch whose inner race is free-rotating, is fitted non-rotatably to the pinion gear 112, and the outer race 151b is fitted non-rotatably into the cylindrical portion 102f. A spacer 143 made of stainless steel alloy interposes between the inner race 151a and the boss 142 on the rotor 103, as shown in FIG. 9. The spacer 143 is a thin round cylindrical component having a cylinder portion 143a and a disk portion 143b; the cylinder portion 143a is fit onto the outer periphery of the boss 142, while the disk portion 143b is sandwiched between the front-end face of the inner race 151a and the boss 142.

In the cylindrical portion 102f interior, a shaft seal 185 having a lip is fitted frontward of the one-way clutch 151. The distal-edge lip of the shaft seal 185 contacts the outer peripheral surface of the cylinder portion 43a of the spacer 143. Herein, liquids are not likely to invade along the inner periphery of the spacer 143, because the disk portion 143b is sandwiched between the boss 142 and the inner race 151a. Accordingly, sealing the outer circumferential surface of the spacer 143 keeps liquids from invading the interior of the cylindrical portion 102f. Herein, once the spacer 143 is installed, if the rotor 103 is not centered correctly, when the shaft seal 185 is brought directly into contact with the boss 142 while fastening the rotor 103 to the pinion gear 112, the shaft seal 185 will not form a good seal with the spacer 143. Thus, mounting the spacer 143 and centering it with the shaft seal 185 in advance stabilizes the sealing ability of the shaft seal 185.

As shown in FIG. 5, the switching mechanism 152 has a stopper shaft 153. The stopper shaft 153 is mounted on the reel body 102a to let it pivot between a non-operational posture and an operational posture. The stopper shaft 153 includes: a stopper knob 153a that passes through and projects rearward from the reel body 102a and the protective cap 113 so that it may be operated; a shaft portion 153b fixed to the stopper knob 153a; and a cam 153c fixed to the tip of the shaft 153b.

As shown in FIG. 6, the stopper knob 153a is removably/reattachably fixed to the shaft 153b by means of an Allen set-screw 158. Herein, the stopper knob 153a is made removable from/reattachable to the shaft 153b because the stopper knob 153a must be taken off when the protective cap 113 is taken off in order to undo the lid member 102d. Using the Allen set-screw 158 for fastening the stopper knob 153a keeps fishing line from getting caught, without sinking the screw head in a hole because the screw has no head. Because the Allen set-screw 158 has no head, using the screw for fastening the stopper knob 153a means that fishing-line snags may be made unlikely without sinking the screw head in a hole.

The cam 153c is toggle-urged between the non-operational posture and the operational posture by means of a toggle-spring mechanism 159. The tip of the cam 153c engages with the one-way clutch 151, and is configured such that the one-way clutch 151 is switched between non-operational posture and an operational posture by the stopper shaft 153 pivoting.

Oscillating Mechanism Configuration

The oscillating mechanism 106, as shown in FIGS. 5 and 7, has a worm 121 disposed approximately directly beneath and parallel to the spool shaft 115, a slider 122 that reciprocates along the worm 121, and an intermediate gear 123 fixed to the fore end of the threaded shaft 121. The slider 122 is movably supported on two guide shafts 124 that are disposed in parallel with the worm 21. The hind end of the spool shaft 115 is non-rotatably fixed to the slider 122. The intermediate gear 123 meshes with the pinion gear 112 via a (not illustrated) gear-down train.

Spool Configuration

The spool 104 has, as shown in FIG. 5, a shallow-channel contour, and is disposed between the first rotor arm 131 and the second rotor arm 132 of the rotor 103. The spool 104 is linked to the fore end of the spool shaft 115 via a drag mechanism 160. The spool 104 includes: a bobbin trunk 104a circumferentially onto which fishing line is wound; a skirt 104b that is integrally formed on the rear of the bobbin trunk 104a; and a flange 104c established on the front end of the bobbin trunk 104a.

The bobbin trunk 104a is an approximately dual-stage drum member having a boss in the center, and the encompassing outer circumferential surface of the drum section constitutes a peripheral surface that parallels the spool shaft 115. The bobbin trunk 104a is mounted, as shown in FIG. 9, rotatively to the spool shaft 115 on two bearings 156, 157 into the boss. The skirt 104b, a round cylindrical component having a base, flares diametrically from the rear end portion of the bobbin trunk 104a, then extends rearward. The front flange 104c includes: a standing portion 104d integrally formed diametrically outward from the front end portion of the bobbin trunk 104a; and a ring portion 104e made of metal or ceramic removably/reattachably mounted on the standing portion 104d. The ring portion 104e is affixed to the standing portion 104d by means of a flange-fastening member 104f that is screwed into the inner circumferential surface of the bobbin trunk 104a.

The position of the spool 104 is set by abutting on a locating washer 154 that is fitted to the spool shaft 115.

Drag Mechanism Configuration

The drag mechanism 160 is mounted between the spool 104 and the spool shaft 115, and is a device for applying drag force to the spool 104. The drag mechanism 160 has, as shown in FIG. 9: a knob unit 161 for adjusting the drag force by hand; and a friction unit 162 made up of a plurality of disks that are pressed toward the spool 104 by means of the knob unit 161.

The knob unit 161 includes: a first member 163 installed non-rotatably yet axially movably on the chamfers 115a; a second member 164 disposed axially frontward of the first member 163 and screwed onto the spool shaft 115; and a sounding mechanism 165 fitted in between the first member 163 and the second member 164.

The first member 163 is a round cylindrical member having a brim, and includes a cylinder portion 163a and a ring-shaped brim portion 163b larger in diameter than the cylinder portion 163a. A flat-sided keyway 166 into which the spool shaft 115 non-rotatably interlocks is formed in the inner margin of the cylinder portion 163a. The rear end face on the cylinder portion 163a of the first member 163 abuts on the friction unit 162. A sealing washer 171 for preventing liquids from invading toward the friction unit 162 from without is fitted between the cylinder portion 163a of the first member 163 and, along the inside of the bobbin trunk 14a, the drum section inner circumferential surface. The sealing washer 171 is a sealing component having a lip on the outer periphery and obtained, e.g., by "outsert"-molding a plate-shaped elastic element made of NBR onto the circumferential perimeter of ring element made of stainless steel. The sealing washer 171 is urged FIG. 8 leftward by a snap ring 179. A ring-shaped protrusion 171c is formed on the FIG. 9 left-hand face of the sealing washer 171. This protrusion 171c abuts a later-described cover member 168 to prevent liquids from invading along the inner margin.

The second member 164 is installed opposing the first member 163, and is rotatable relative to the first member 163. The second member 164 includes: a knob body 167 disposed aligned frontward of the first component 163 in the spool shaft 115 direction; and the cover member 168, whose fore end is fixed to the outer periphery of the knob body 167, and in the interior of which the first component 163 is reltaively rotatably housed.

The knob body 167 is a saucer-shaped component, the front surface of which forms a forward projecting, roughly trapezoidal knob 167a. A nut 169 that screws-join into the fore end of the spool shaft 115 is fitted non-rotatably yet axially movably in the interior of the knob body 167. Further, a coil spring 170 is disposed in the compressed state about the outer periphery of the spool shaft 115 in the interval between the second member 164 and the nut 169.

The cover member 168 is a cylindrical component having a stepped base, through which base the round cylinder portion 163a of the first component 163 passes. Further, the protrusion 171c on the sealing washer 171 abuts on the base. A cylinder portion 168a of the cover member 168 is screw-stopped onto the outer circumferential surface of the knob body 167.

An O-ring 173 is fitted in between the knob body 167 and the fore end of the cylinder portion 168a of the cover member 168. The O-ring 173 is an elastic element made, e.g., of NBR, and is provided in order to prevent liquids from invading the interior from the clearance between the first component 163 and the knob body 167 of the second member 164. As far as liquids invading through this clearance is concerned: It could happen for example that though the sealing washer 171 is provided, water might encroach through the clearance between the first component 163 and the spool shaft 115 and as far as the friction unit 162. The friction portion 162 might then get wet, altering the drag force.

The friction unit 162 includes a disk 191 that contacts the first component 163, and a drag sounding mechanism 193 fitted to the first disk 191. The first disk 191 has: an inner disk portion 191a; a circular cylinder portion 191b that extends rearward from the circumferential periphery of the inner disk portion 191a; and an outer disk portion 191c that extends diametrically outward from the rear end of the circular cylinder portion 191b. By interlocking the spool shaft 15 into the inner disk portion 191a, the first disk 191 is non-rotatable with respect to the spool shaft 115. Furthermore, the drag sounding mechanism 193 is fitted to the outer disk portion 191c, and meanwhile is contiguous with the spool 104 via drag disks 192 made of graphite. When the spool shaft 15 and the spool 104 are relatively rotatable, i.e., during drag operation, the drag sounding mechanism 193 issues sound.

Reel Handling and Operation

With this spinning reel, when the line is to be reeled out during casting or the like, the bail arm 140 is flipped over into the line-releasing posture. Consequently, the fishing line is reeled out successively from the leading-edge side of the spool 104 by the terminal tackle under its own weight.

During line retrieval, the bail arm 140 is returned into the line-retrieving posture. This automatically takes place by the operation of a not-illustrated bail-flipping mechanism when the handle assembly 101 is rotated in the line-retrieving direction. The handle assembly 101 torque is transmitted to the pinion gear 112 via the master-gear shaft 110 and the master gear 111. The torque transmitted to the pinion gear 112 is transmitted from its front portion 112a to the rotor 103, and meanwhile is transmitted via the gear-down train to the oscillating mechanism 106 by the intermediate gear 123 that meshes with the pinion gear 112. Consequently, along with the rotor 103 rotating in the line-retrieving direction, the spool 104 pumps back and forth.

In the course of fishing, there are times when waves splash on the reel and the reel gets wet. Because the sealing washer 171 and the O-ring 173 are fitted in the drag mechanism 160, water is not apt to encroach from the front or rear to the friction unit 162. Therefore, once the drag force is adjusted, fluctuations in the drag force due to water soaking in will be scarce.

Furthermore, furnishing the seal member 109 in the handle assembly 101 clearance with the reel body 102a, and furnishing the waterproofing seal 181 between the reel body 102a and the cover member 102d prevents liquids from invading into the interior mechanism-mounting space. This keeps seawater and the like from entering the interior, making it unlikely that crystalline deposits of salt will form on the gears, guide sections and inside the bearings.

Other Embodiments (a) The foregoing Embodiment 1 was illustrated as an example in a lever-drag type dual-bearing reel, and the foregoing Embodiment 2 was illustrated as an example in a front-drag type spinning reel; but the present invention may be applied to all seal structures employed in fishing reels, such as: star-drag type dual-bearing reels, or rear-drag type spinning reels, or spinning reels not having a drag, or lever-drag type spinning reels.

(b) In the foregoing embodiment, NBR was exemplified as a seal-member material, but "an elastic substance" is not limited to NBR, and includes all elastic substances, such as silicone rubber, styrene rubber, and natural rubber.

(c) In the foregoing embodiment, the handle assembly 101 structured to be fastened to the master gear shaft 110 by means of the fixing screw 118 was exemplified, but the present invention may be applied also to a handle assembly structured to fasten by screwing into the master gear shaft 110.

Effects of Invention

In accordance with the present invention, the fact that the tapered sealing portion is brought into contact with the second member to seal the clearance between the two members makes the surface area of the contacting part is small, making degradation in rotational performance unlikely. Likewise the fact that like an O-ring the entire seal member is made of an elastic substance makes it extendable/contractible, so that it may be fastened to the first member simply—merely by fitting the cylindrical portion into a groove, for example. Components and space for fastening the seal member are therefore made unnecessary.

The terms of degree such as "substantially", "about" and "approximately" as used herein mean a reasonable amount of deviation of the modified term such that the end result is not significantly changed. These terms should be construed as including a deviation of at least +5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing description of the embodiments according to the present invention are provided for illustration only, and not for the purpose of limiting the invention as defined by the appended claims and their equivalents.

What is claimed is:

1. A sealing structure for a fishing reel, comprising:
    a handle spindle having a spindle-formed portion;
    a reel unit having an inner peripheral surface disposed about an outer peripheral surface of said spindle-formed portion, said reel unit being rotatable relative to said handle spindle; and
    a seal member for sealing a clearance between said spindle-formed portion of said handle spindle and said reel unit, and having
        a cylindrical portion made of an elastic substance and mountable on said spindle-formed portion of said handle spindle, and a sealing portion formed integrally on an outer circumferential surface of said cylindrical portion and tapering toward said inner peripheral surface of said reel unit such that a distal edge of said sealing portion can contact said reel unit, said sealing portion having a lip portion that can contact said reel unit, said lip portion extending outward and away from said reel unit and being inclined relative to said spindle-formed portion of said handle spindle.

2. The sealing structure for a fishing reel set forth in claim 1, wherein said spindle-formed portion of said handle spindle has an annular groove formed in said outer circumferential surface opposing said reel unit, and said cylindrical portion is fitted into said annular groove.

3. The sealing structure for a fishing reel set forth in claim 1, wherein said reel unit has a reel body and a boss portion projecting from said reel body, and said seal member seals a clearance between said spindle-formed portion of said handle spindle and said boss portion.

4. A fishing reel, comprising:

a reel unit having a master gear shaft;

a spool shaft rotatively fitted in a central portion of said reel unit;

a spool carried rotatively yet axially immovably on said spool shaft;

a handle assembly detachably and reattachably disposed sideways on said reel unit and having;
   a handle
     a handle spindle having a spindle-formed portion coupled detachably and reattachably to said master gear shaft of said fishing reels, said reel unit a having an inner peripheral surface disposed about an outer peripheral surface of said spindle-formed portion of said handle spindle, said reel unit rotatably supporting said handle spindle; and a seal member for sealing a clearance between said spindle-formed portion of said handle spindle and said reel unit, and having
   a cylindrical portion made of an elastic substance and mountable on said spindle-formed portion of said handle spindle, and
   a sealing portion formed integrally on an outer circumferential surface of said cylindrical portion and tapering toward said inner peripheral surface of said reel unit such that a distal edge of said sealing portion can contact said reel unit.

5. The fishing reel set forth in claim 4, wherein said spindle-formed portion of said handle spindle has an annular groove formed in said outer circumferential surface opposing said reel unit, and said cylindrical portion is fitted into said annular groove.

6. The fishing reel set forth in claim 4, wherein said sealing portion includes a lip portion that contacts said reel unit, said lip portion extending outward and away from said reel unit and being inclined relative to said spindle-formed portion of said handle spindle.

7. The fishing reel set forth in claim 4, wherein said reel unit has a reel body having said master gear shaft therein, and a boss portion projecting from said reel body, and said seal member seals a clearance between said spindle-formed portion of said handle spindle and said boss portion.

* * * * *